J. C. RHODES, G. E. GUFFEY AND J. G. SHEEHAN.
STEERING WHEEL BRAKE.
APPLICATION FILED DEC. 29, 1917.
1,305,934.  Patented June 3, 1919.
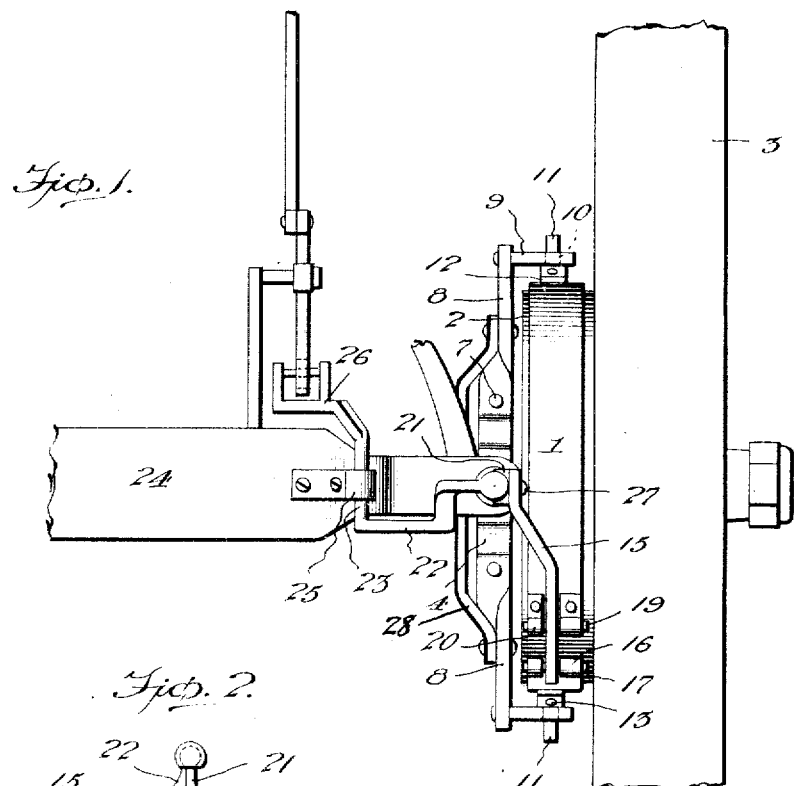
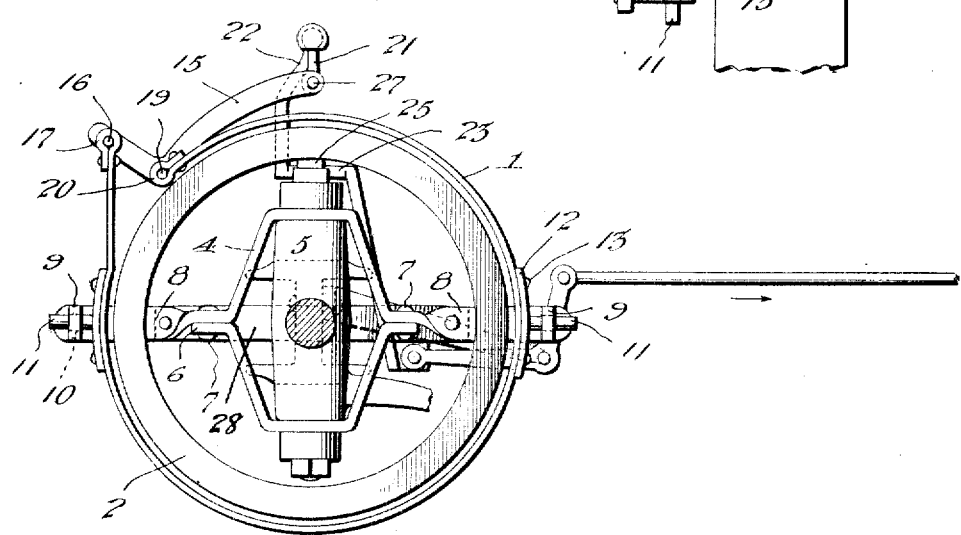

UNITED STATES PATENT OFFICE.

JOSEPH C. RHODES, GEORGE E. GUFFEY, AND JAMES G. SHEEHAN, OF DANVILLE, KENTUCKY.

STEERING-WHEEL BRAKE.

1,305,934.  Specification of Letters Patent.  Patented June 3, 1919.

Application filed December 29, 1917. Serial No. 209,503.

*To all whom it may concern:*

Be it known that we, JOSEPH C. RHODES, GEORGE E. GUFFEY, and JAMES G. SHEEHAN, citizens of the United States, residing at Danville, in the county of Boyle and State of Kentucky, have invented new and useful Improvements in Steering-Wheel Brakes, of which the following is a specification.

This invention relates to steering wheel brakes the object in view being to provide brake mechanism adapted to be mounted upon and used in conjunction with one or both of the front steering wheels of a motor vehicle, the said brake mechanism being capable of being utilized in conjunction with the brake mechanism of the rear or driving wheels of the vehicle.

A further object of the invention is to provide brake mechanism the construction of which enables the same to be readily applied to any make of motor vehicle either at the time of manufacture of the vehicle or subsequent thereto, the improved brake mechanism not interfering in any way with the perfect operation of the steering mechanism.

With the above and other objects in view, the invention consists in the novel construction, combination and arrangement of parts, herein fully described, illustrated and claimed.

In the accompanying drawing:—

Figure 1 is a horizontal section through one of the steering wheels of a motor vehicle and other parts adjacent thereto, said section being taken above the spindle of the steering knuckle.

Fig. 2 is a vertical section taken in a plane parallel to the inner face of the wheel, showing the improved brake mechanism.

While the improved brake mechanism is of course applicable to both of the front or steering wheels of the machine, it is only necessary to describe the brake mechanism as used in conjunction with one of said wheels, a description of one answering for both.

The improved brake, in the preferred embodiment thereof, comprises a brake band 1 which encircles and is adapted to bear against the outer face of a brake drum 2 which has a fixed relation to the adjacent steering wheel 3 of the vehicle.

In connection with the brake band 1, we employ a brake band hanger, the same comprising an open center structure 4 adapted to embrace or extend above and below the main body 5 of the adjacent steering knuckle upon which the wheel is journaled in the usual way. The hanger is preferably constructed in two substantially U-shaped but relatively inverted parts, one of said parts being formed with projections or ears 6, enabling the same to be fastened to the other part of the hanger by means of bolts 7 or the equivalent thereof.

Projecting horizontally and in opposite directions from the open center of the body of the hanger, are brake band supporting arms 8 which extend beyond the brake drum and brake band and have lateral extensions 9 which overlap the brake band. These extensions 9 are formed with openings or slots 10 to receive and admit of a certain limited movement of pins or studs 11 having oppositely extending flanges 12 at their inner ends which are secured by fastening means 13 to the brake band 1 at about diametrically opposite points. Said studs 11 are adapted to slide radially with relation to the center of the wheel through the openings or slots in the extensions 10 and said studs are also capable of a limited movement circumferentially of the brake band. This enables the brake band to accommodate itself to the brake drum as it is contracted or allowed to expand. The brake band is also maintained thereby in alinement with the brake drum.

The opposite extremities of the brake band are connected to a common brake band contracting lever 15 having at one point oppositely extending studs 16 which are received in eyes 17 at one end of the brake band. Said lever is also provided at a point distant from said pins or studs 17 with other pins or studs 19 which are received in other eyes 20 at the opposite extremity of the brake band. The arrangement is such that by rocking the lever 15, the brake band may be contracted around the brake drum or allowed to expand. The main body of the lever 15 is curved but gradually diverges from the outer face of the brake band as shown and the extremity of the lever is connected by a link 21 to the extremity of the outer or upper arm 22 of a bell crank lever having a journal portion 23 extending transversely of the vehicle axle 24 and mounted in a bearing 25 secured to said axle. The other arm 26 of said bell crank lever is adapted to have any suitable brake connections attached thereto. The link 21 is connected to the lever 15 by means of a pivot 27 the axis of which is substantially parallel to the longitudinal axis of the vehicle axle. The connection between the lever 15 and the bell crank lever is arranged directly over the vertical axis on which the steering knuckle turns. Therefore the turning of the steering wheel of the machine does not in any way interfere with the proper working of the brake mechanism.

The improved brake mechanism hereinabove described may be applied to any make of vehicle either during manufacture or at a time subsequent thereto and the front wheel brake mechanism may be used either independently of or in conjunction with the rear wheel brake mechanism. A brace 28 is terminally fastened to the member 8 and passes behind the body 5 of the steering knuckle.

We claim:—

1. In front wheel brake mechanism for motor vehicles, means for supporting an external contracting brake band in constant working relation to a brake drum on said wheel, said means consisting of a hanger having an open center frame portion adapted to embrace and receive the adjacent steering knuckle, said hanger also having means to support the brake band.

2. In front wheel brake mechanism for motor vehicles, means for supporting an external contracting brake band in constant working relation to a brake drum on said wheel, said means consisting of a hanger having an open center frame portion adapted to embrace and receive the adjacent steering knuckle, said hanger having oppositely extending arms with angular end portions apertured to receive studs on the brake band.

In testimony whereof we affix our signatures.

JOSEPH C. RHODES.
GEORGE E. GUFFEY.
JAMES G. SHEEHAN.

Copies of this patent may be obtained for five cents each, by addressing the "Commissioner of Patents, Washington, D. C."